United States Patent [19]

Cessna

[11] Patent Number: 5,154,982
[45] Date of Patent: Oct. 13, 1992

[54] BIODEGRADABLE FOOD TRAYS

[75] Inventor: Frank L. Cessna, Middletown, Ohio

[73] Assignee: The Sorg Paper Company, Middletown, Ohio

[21] Appl. No.: 579,348

[22] Filed: Sep. 7, 1990

[51] Int. Cl.$^5$ ............................................. B32B 21/04
[52] U.S. Cl. .................................. 428/537.5; 162/146; 162/180; 229/2.5 R
[58] Field of Search ..................... 162/146, 180; 229/2.5 R; 428/537.5

[56] References Cited

U.S. PATENT DOCUMENTS

| | | | |
|---|---|---|---|
| 3,795,575 | 3/1974 | Gouw | 162/175 |
| 3,802,959 | 4/1974 | Francis et al. | 162/175 |
| 3,936,347 | 2/1976 | Nomura | 162/146 |
| 4,210,487 | 7/1980 | Driscoll | 264/147.51 |
| 4,274,915 | 6/1981 | Munari | 162/129 |
| 4,291,781 | 9/1981 | Niguchi et al. | 181/169 |
| 4,496,427 | 1/1986 | Davison | 162/157 R |
| 4,904,520 | 2/1990 | Dumas et al. | 428/212 |
| 4,980,337 | 12/1990 | Kawaski | 503/226 |
| 5,001,033 | 3/1991 | Takeno et al. | 430/212 |

Primary Examiner—Edith L. Bottalow
Attorney, Agent, or Firm—Frost & Jacobs

[57] ABSTRACT

A biodegradable food tray is thermoformed from one or two sheets composed of a major proportion of virgin wood pulp and minor proportions of polyolefin synthetic pulp, clay and cationic dispersed rosin, the sheets optionally containing a non-toxic coloring dye, the thermoforming of the tray acting to melt the synthetic pulp and rosin, thereby fusing the sheet to form a tray which is imperforate to penetration by grease over an extended period of time. Optionally, the sheets may be thermoset under heat and pressure without deformation to form grease proof sheets for use as such. In its method aspects, the invention contemplates the formulation of the furnish and its formation into sheets and trays.

12 Claims, No Drawings

BIODEGRADABLE FOOD TRAYS

This invention relates to the provision of biodegradable food trays and has to do more particularly with the provision of sheet materials which may be readily thermoformed into trays which are highly grease resistant.

BACKGROUND OF THE INVENTION

The bulk of the meat trays currently in use for the packaging of raw or partially prepared foods, such as cuts of meat, sausages and meat patties, are formed from polystyrene or from inexpensive wood pulps which are surface treated with various grease-resistant compounds. Such trays have numerous disadvantages. In the case of polystyrene trays, they are neither biodegradable nor are they capable of being incinerated without producing toxic waste. While biodegradable, trays formed from wood pulp lack sufficient grease proofness, particularly where a relatively long shelf life is required, and in addition they often contain undesirable toxic contaminants, such as dioxins, which have become of increasing concern because of their carcinogenic properties.

While efforts have hitherto been made to improve existing wood pulp trays by adding synthetic polyolefin fibers to the furnish, trays formed using such synthetic fibers have fallen short of providing food trays which are both readily biodegradable and at the same time provide effective grease proofness over an extended period of time.

SUMMARY OF THE INVENTION

In accordance with the present invention, a sheet forming furnish is provided which comprises a major proportion of selected wood fibers together with minor proportions of polyolefin synthetic pulp and clay, the furnish so formed including a highly stable cationic dispersed rosin size which, when utilized in conjunction with the polyolefin fibers, has been found to provide a sheet having exceptional grease resistance as well as being biodegradable.

If desired, the sheet may incorporate approved nontoxic dyes so that the resultant trays may be provided in a variety of colors for color-coding or for decorative purposes.

It has been found that the manner of compounding and admixing the ingredients of the sheet is important, it being essential to minimize undesirable working of the polyolefin pulp. Accordingly, the wood fibers and clay are initially admixed with water to form a slurry, with the polyolefin pulp added after thorough working and hydration of the wood pulp.

It also has been found important to incorporate the cationic dispersed rosin size at a time when the fiber make-up of the furnish is such that the furnish is highly fluid if optimum grease proofness is to be obtained. It is also important that the dryer heat be carefully controlled so that the sheet is at no time subjected to sufficient heat to melt the polyolefin fibers or soften them to the point where undesirable sticking to the dryer rolls will occur.

The sheet stock from which the trays are formed preferably will have a total basis weight of approximately 350 lbs. per ream ($24 \times 36 \times 500$), which in most instances will comprise two sheets of stock each having a basis weight of approximately 175 lbs. per ream ($24 \times 36 \times 500$) due to the limitations on the basis weight of stock which can be produced on a Fourdrinier paper making machine. If a cylinder board machine is available having the capability of producing a 350 lb. per ream ($24 \times 36 \times 500$) basis weight sheet, a single sheet may be used. Where the trays are formed from two sheets, the sheets will be laminated together as an incident of thermoforming the sheets into the desired tray configuration.

It is thus a primary object of the present invention to provide food trays which are biodegradable and otherwise readily disposable after use, the tray being effectively grease-proof over an extended period of time, such as one month or more.

Further objects of the invention are the provisions of a sheet stock which may be readily laminated as an incident of a thermoforming operation, the resultant laminate being characterized by complete fusion of the polyolefin fibers and the cationic dispersed rosin size, thereby providing a smooth, uniform, composite tray which inhibits penetration by grease or other fluids to which it is subjected for an extended period of time.

While sheet stock in accordance with the invention is intended primarily for the production of trays which are sufficiently rigid and self-sustaining to effectively support the products being packaged, such sheet stock also may be utilized to form various types of package liners where a high degree of grease proofness is required.

DESCRIPTION OF THE PREFERRED EMBODIMENT

At the outset, it will be understood that sheet material in accordance with the present invention may be produced using conventional paper making equipment and will be described in conjunction with a Fourdrinier machine, although it will be understood that the sheet stock can be produced using a cylinder board machine. Similarly, the sheets may be thermoformed into the desired tray shapes utilizing conventional heated forming dies which will draw the sheets into the desired shape under heat and pressure.

THE FURNISH

In accordance with the invention, the furnish comprises a blend of:
1. 60-80% virgin wood pulp;
2. 20-40% polyolefin synthetic pulp;
3. 10-15% clay;
4. 1-2% cationic dispersed rosin; and
5. optionally, the furnish may contain a dye system approved for food contact.

All of the foregoing percentages are on a dry weight basis, with the percentages of clay and cationic dispersed rosin based upon the total dry weight of the fibers, i.e.. the wood pulp and the polyolefin synthetic pulp.

1. The Wood Pulp Fibers

Care must be taken to select virgin pulps which are low in dioxins, which will readily hydrate, and which will provide a sheet having high brightness. To this end the wood pulp may consist solely of Northeast bleached softwood kraft, or it may comprise a blend of Northeast bleached softwood kraft and up to 50% Northeast hardwood kraft. Recycled fibers should be avoided due to the possible inclusion of carcenogenic dioxins. An equal blend of Northeast bleached softwood and hardwood kraft is preferred since such blend has been found to give highly uniform sheet formation and at the same time reduce pulp cost in that the hardwoods are normally less expensive than the softwoods. While a preference is expressed for Northeast bleached krafts due to their hydration properties, Southern bleached softwood krafts also may be employed, such as the slash pines and/or the Loblolly pines. A blend of 20–40% of Southern bleached softwood kraft and 60–80% of Northeast hardwood will provide satisfactory sheets.

2. The Synthetic Polyolefins

Polyolefin synthetic pulps are formed from either high density polyethylene or polypropylene, such as the Pulpex ® polyolefin pulps manufactured by Hercules, Inc. of Wilmington, Del. The Hercules polyethylene pulp, known as Pulpex EA, is preferred to polypropylene pulp, known as Pulpex P, due to its substantially lower melting range, the polyethylene pulp having a melting range of 130°–135° C. (266°–275° F.), whereas the polypropylene pulp has a melting range of 160°–165° C. (320°–330° F.). In addition, the polyethylene pulp has been found to shorten the dwell time of the press during thermoforming of the sheets, which is highly advantageous from a production standpoint.

Other suitable polyethylene pulps are sold under the designation 9400 by Mitsui Chemical Company, and under the designation Q.P. 3850 by Dupont (Canada). Al of the foregoing pulps provide very fine, highly branched, discontinuous, water-dispersible fibers as compared to extruded stable fibers, which are in the nature of smooth rods of solid polymer.

3. The Clay

The clay will comprise approximately 10–15% of the dry weight of the furnish (wood pulp and synthetic pulp combined), and preferably will comprise a kaolin clay, although, any conventional clay may be utilized. The clay assists in the deep drawing of the sheets during thermoforming and is particularly advantageous in preventing stress cracking.

4. The Cationic Dispersed Rosin

Grease resistance has posed a major stumbling block in providing a biodegradable sheet having the ability to withstand penetration by grease and other liquid contaminants for at least 30 days. Numerous grease proofing chemicals have been tried with no real success, and it was not until it was discovered that a cationic dispersed rosin size, such as Hi-pHase ® 35, manufactured by Hercules, Inc., would effectively interact with polyolefin pulp to produce the desired degree of grease proofness that a satisfactory sheet was obtained. Hi-pHase ® 35 is a 35% solids dispersion of cationic modified fumaric acid adducted tall oil rosin which is recommended for the sizing of paper and paperboard, but it has not been hitherto recognized that if combined in a furnish containing from 60–80% selected virgin wood pulps and from 20–40% polyolefin synthetic pulp, a truly grease-proof sheet would result. Reference is made to U.S. Pat. No. 3,966,654, issued Jun. 29, 1976 which discloses cationic dispersed rosins of the type referred to above.

As discussed in greater detail hereinafter, the cationic dispersed rosin may be introduced during blending of the polyolefin pulp into the furnish, although it is preferably introduced just prior to the introduction of the furnish into the headbox of the papermaking machine. When so blended, it has been found that upon subsequent thermoforming of the sheets, fusion takes place between the polyolefin fibers and the cationic dispersed rosin, thereby thermally fusing the sheet and rendering it imperforate to penetration by grease or other potential saturants.

5. The Dye

If a dye is to be used, it should comprise one which has FDA approval for contact with food. By way of a non-limiting example, a dye known as Pigment Yellow 14, which is one of a family of dyes manufactured by Sandoz Chemicals of Charlotte, N.C., has been found to produce highly satisfactory results when used in amounts comparable to those used in the dyeing of conventional paper furnishes.

BLENDING THE FURNISH

While conventional papermaking techniques are utilized in compounding the furnish, there are certain critical variations which must be closely followed. Conventionally, all of the fibers are initially blended into a slurry in a beater wherein the fibers are admixed with sufficient water to form a slurry, the fibers being subjected to relatively severe working. In the present method, only the wood fibers are introduced into the beater, together with the clay and the dye, if the furnish is to be colored or otherwise tinted. It is important that the polyolefin fibers are not introduced into the beater, but rather are introduced into the furnish in the blend chest which receives the output of the beater, the blend chest subjecting the furnish to mild agitation which is sufficient to thoroughly blend the polyolefin fibers with the wood fibers and clay, but insufficient to adversely affect the length and integrity of the polyolefin fibers.

The cationic dispersed rosin also may be introduced into the furnish in the blend chest where it is lightly worked along with the polyolefin fibers, although it is preferred to introduce the cationic dispersed rosin just prior to the delivery of the furnish to the headbox. It has been found that the consistency of the furnish, i.e.. its fiber make-up and mobility, at the time the cationic dispersed rosin is introduced is important in dispersing the rosin so that it will effectively interact with the polyolefin fibers to enhance the grease proofness of the resultant sheets when subjected to heat and pressure during subsequent thermoforming of the sheets into trays.

The furnish is normally fed from the blend chest to a holding chest from which it is metered to a Jordan in which the furnish is lightly worked just prior to its introduction into the head box of the paper making machine, the head box serving to deposit the furnish as a web on the Fourdrinier screen. Preferably the cationic dispersed rosin is introduced at the fan box which delivers the furnish from the Jordan to the head box, although it may be applied at the Jordan. Upon partial dewatering and the formation of a discreet web or sheet, the sheet is removed from the Fourdrinier screen and passed around a series of dryer and calendaring rolls which remove residual water and compress the sheet to its desired final thickness.

In accordance with the invention, extreme care must be taken in drying the sheet, with particular reference to the heating of the dryer rolls which must be carefully controlled to avoid melting of the polyolefin fibers or bringing them sufficiently close to their melting point so as to result in sticking to the dryer cans. Preferably, the dryer cans will operate at temperatures of approximately 250° F. at the leading end of the dryer stack, the temperature of the cans progressively increasing up to an optimum of not more than about 260° F., which will maintain the sheet below the melting point of the polyethylene pulp. While the melting point of polypropylene pulp is substantially above 300° F., it is nonetheless preferred to use polyethylene pulp due to the reduced dwell time required to thermoform the sheets In addition, it has been found that it is more difficult to control the temperature of the dryer cans at higher temperatures than it is at lower temperatures, and consequently it is more difficult to control the temperature of the sheet stock during drying.

Following drying, the sheet material may be formed into rolls for subsequent storage and ultimate formation into sheets of a size to be drawn into the desired tray configuration by heat and pressure.

The resultant sheets will preferably have a basis weight of 175 lbs. per ream (24×36×500) with the usual tolerance of plus or minus 5 lbs. if produced on a Fourdrinier machine, although the sheets may have a basis weight of 350 lbs. per ream (24×36×500) plus or minus 5 lbs. per ream if produced on a cylinder board machine.

TRAY FORMATION (THERMOFORMING)

Since, as previously pointed out, it has been found that highly satisfactory trays from the standpoint of strength and rigidity can be formed from stock having a basis weight of about 350 lbs. per ream (24×36×500), and given the limits in basis weight obtainable in sheet stock produced on a Fourdrinier machine, it is preferred to form the trays by laminating two sheets of stock each having a basis weight of approximately 175 lbs. per ream (24×36×500). Such lamination will occur simultaneously with the thermoforming of the sheets to the desired tray configuration, two sheets being juxtaposed between press platen configured to produce the desired tray configuration.

In the preferred thermoforming procedure using sheets incorporating polyolefin fibers, two sheets are aligned between the die platen which are heated to a temperature of approximately 290° F.-350° F., the sheets being pressed under a pressure of from 600-1000 p.s.i. for a dwell time of up to about 3 minutes. Where polyethylene fibers are used, a lower press temperature, such as 290° F. is preferred, whereas higher temperatures are preferred where polypropylene fibers are used. It will be understood that dwell time encompasses actual press time under pressure as well as cooling time upon opening of the dies prior to removal of the trays from the dies. The foregoing procedures result in the formation of laminated trays in which the two plies are permanently bonded together. In addition, complete fusion takes place, the wood fibers being plasticised by the interaction of the polyolefin fibers and the cationic dispersed rosin which effectively encapsulate the wood fibers and clay. The resultant trays are characterized by closed surfaces which are smooth and hard, and which are effectively impervious to penetration by grease and other liquids associated with food products. The finish imparted by the dies gives the sheets a high sheen, which is desirable from an appearance standpoint. If coloring dyes are used, they are effectively encapsulated in the sheet and will not bleed onto the food. While harmless, the dyes could otherwise discolor the food, thereby providing an objectionable appearance.

The two sheets making up the laminate may be of the same color or they may be of different colors, in which event the opposite sides of the tray may be of contrasting colors. If enhanced strength and rigidity are desired, or if lighter basis weight sheets are used, the trays may be provided with reinforcing ribs or dimples by suitably configuring the die platen.

Trays made in accordance with the invention, in addition to being biodegradable, may be readily incinerated and also may be comminuted in a conventional home disposer without fouling the disposer. Since the residue is biodegradable, no problems are encountered in disposal either through a sewer system or a septic tank. It also has been found that the trays may be used in a microwave oven and irradiated for extended cooking cycles without adversely affecting the integrity of the trays or their grease proofness.

Modifications may be made in the invention without departing from its spirit and purpose, the critical consideration being the provision of sheet stock which, when thermoformed, provides trays or similar containers which are non-toxic and possess a high degree of grease proofness over an extended period of time. To this end, adjustments may be made in the processing techniques commensurate with maintaining the desired characteristics of the trays. For example, the furnish can be formulated using a hydropulper, in which event great care must be taken to insure thorough admixture of the ingredients making up the furnish.

In forming the trays, it has been found that the time/temperature/pressure parameters given above will apply equally to single sheets having a basis weight of approximate 350 lbs. per ream, the primary objective in all instances being to achieve complete fusion of the sheet or sheets while minimizing press dwell time. It is to be understood that sheet material in accordance with the invention may be used in applications where thermoforming to a desired shape is not required. For example, the sheets in flat form may be thermoset between opposing planar platens to form grease proof sheets which may be used as stiffness for the packaging of bacon in plastic wrappers, or used as liners in the packaging of diverse products where grease proofness is required. To this end, the basis weight of the sheets may be varied consistent with the desired stiffness and flexibility to be imparted to the sheets for their intended use.

I claim:

1. A biodegradable sheet for use in the manufacture of grease proofed trays, said sheet consisting essentially of:
   60–80% virgin wood pulp;
   20–40% polyolefin synthetic pulp;
   10–15% clay; and
   1–2% cationic dispersed rosin;
all on a dry weight basis, the percentages of clay and cationic dispersed rosin being based on the total weight of the pulps, said sheet being characterized by being thermoformable to provide a tray in which the polyolefin pulp and the cationic dispersed rosin fuse with the wood pulp and clay to form a plasticized sheet exhibiting high grease proofness.

2. The biodegradable sheet claimed in claim 1 wherein said virgin wood pulp comprises bleached softwood kraft.

3. The biodegradable sheet claimed in claim 2 wherein said virgin wood pulp comprises a blend of bleached softwood kraft and up to 50% hardwood kraft.

4. The biodegradable sheet claimed in claim 1 wherein the polyolefin synthetic pulp comprises polyethylene.

5. The biodegradable sheet claimed in claim 1 wherein the polyolefin synthetic pulp comprises polypropylene.

6. The biodegradable sheet claimed in claim 1 wherein said cationic dispersed rosin comprises a 35% solids dispersion of cationic modified fumaric acid adducted tall oil rosin.

7. The biodegradable sheet claimed in claim 1 wherein said sheet has a basis weight of 175 lbs. per ream (24×36×500).

8. The biodegradable sheet claimed in claim 1 wherein said sheet has a basis weight of 350 lbs. per ream (24×36×500).

9. The biodegradable sheet claimed in claim 1 wherein said virgin wood pulp comprises a blend of 50% bleached softwood kraft and 50% hardwood kraft, wherein said polyolefin synthetic pulp comprises polyethylene, wherein said cationic dispersed rosin comprises a 35% solids dispersion of cationic modified fumaric acid adducted tall oil rosin, and wherein said sheet has a basis weight of 175 lbs. per ream (24×36×500).

10. A biodegradable food tray consisting essentially of at least one sheet composed of:
   60–80% virgin wood pulp;
   20–40% polyolefin synthetic pulp;
   10–15% clay; and
   1–2% cationic dispersed rosin;
all on a dry weight basis, the percentages of clay and cationic dispersed rosin being based on the total weight of the pulps, said tray being characterized in that said polyolefin synthetic pulp and said cationic dispersed rosin are fused with the wood fibers and clay under heat and pressure to form a plasticized tray exhibiting a high degree of grease proofness over an extended period of time.

11. The biodegradable food tray claimed in claim 10 wherein said virgin wood pulp comprises a blend of bleached softwood kraft and up to 50% hardwood kraft, wherein said polyolefin synthetic pulp comprises polyethylene, and wherein said cationic dispersed rosin comprises a 35% solids dispersion of cationic modified fumaric acid adducted tall oil rosin.

12. The biodegradable food tray claimed in claim 11 wherein said tray consists of two sheets laminated together as an incident of said tray being plasticized under heat and pressure.

* * * * *